D. CONN, Jr.
TRACTOR.
APPLICATION FILED JUNE 10, 1912.

1,087,571.

Patented Feb. 17, 1914.
4 SHEETS—SHEET 1.

Witnesses:
M. L. Jennings
W. H. Brown

Inventor,
David Conn, Jr,
by
G. C. Kennedy.
Attorney.

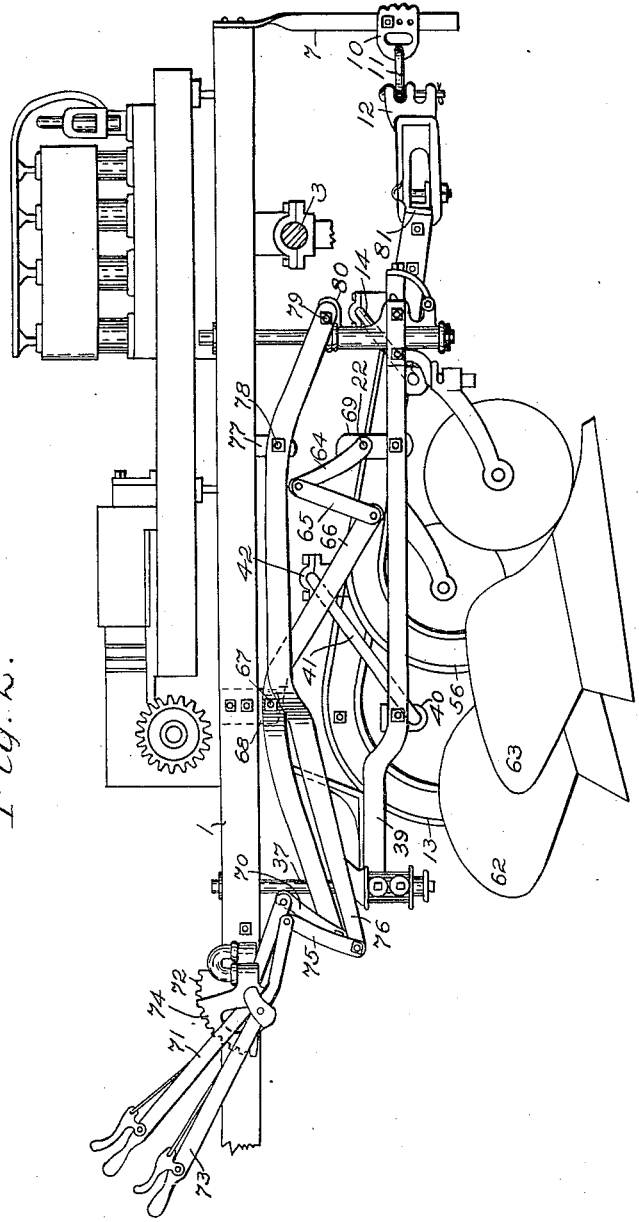

D. CONN, Jr.
TRACTOR.
APPLICATION FILED JUNE 10, 1912.
1,087,571.
Patented Feb. 17, 1914.
4 SHEETS—SHEET 3.
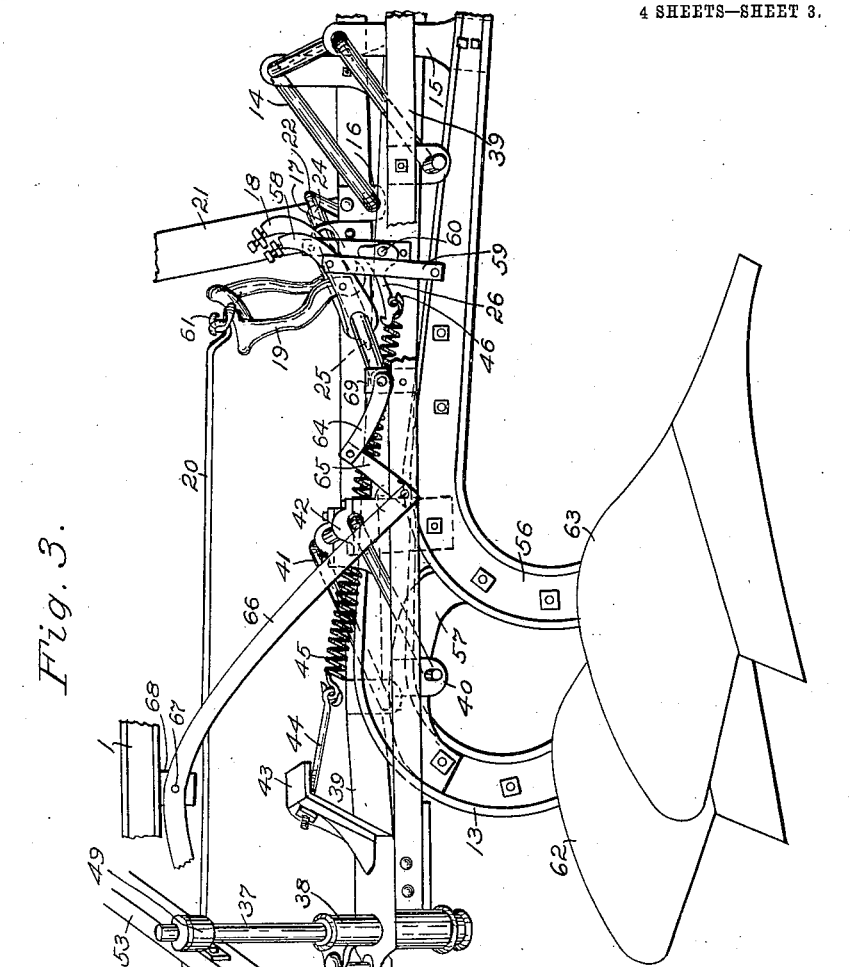
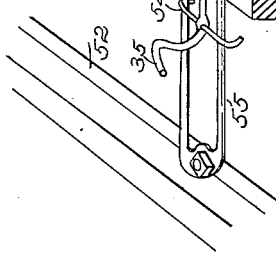
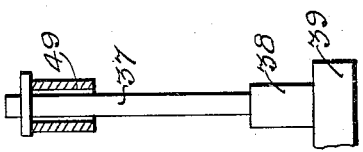
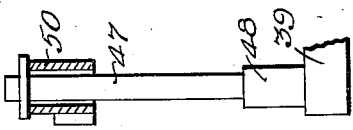
Witnesses:
Inventor,
David Conn, Jr, by
Attorney.

D. CONN, Jr.
TRACTOR.
APPLICATION FILED JUNE 10, 1912.

1,087,571.

Patented Feb. 17, 1914.
4 SHEETS—SHEET 4.

Witnesses:
M. L. Jennings
W. H. Brown

Inventor,
David Conn, Jr. by
G. C. Kennedy
Attorney.

UNITED STATES PATENT OFFICE.

DAVID CONN, JR., OF WATERLOO, IOWA.

TRACTOR.

1,087,571.  Specification of Letters Patent. Patented Feb. 17, 1914.

Application filed June 10, 1912. Serial No. 702,865.

*To all whom it may concern:*

Be it known that I, DAVID CONN, Jr., a citizen of the United States of America, and a resident of Waterloo, Blackhawk county, Iowa, have invented certain new and useful Improvements in Tractors, of which the following is a specification.

Figure 1:
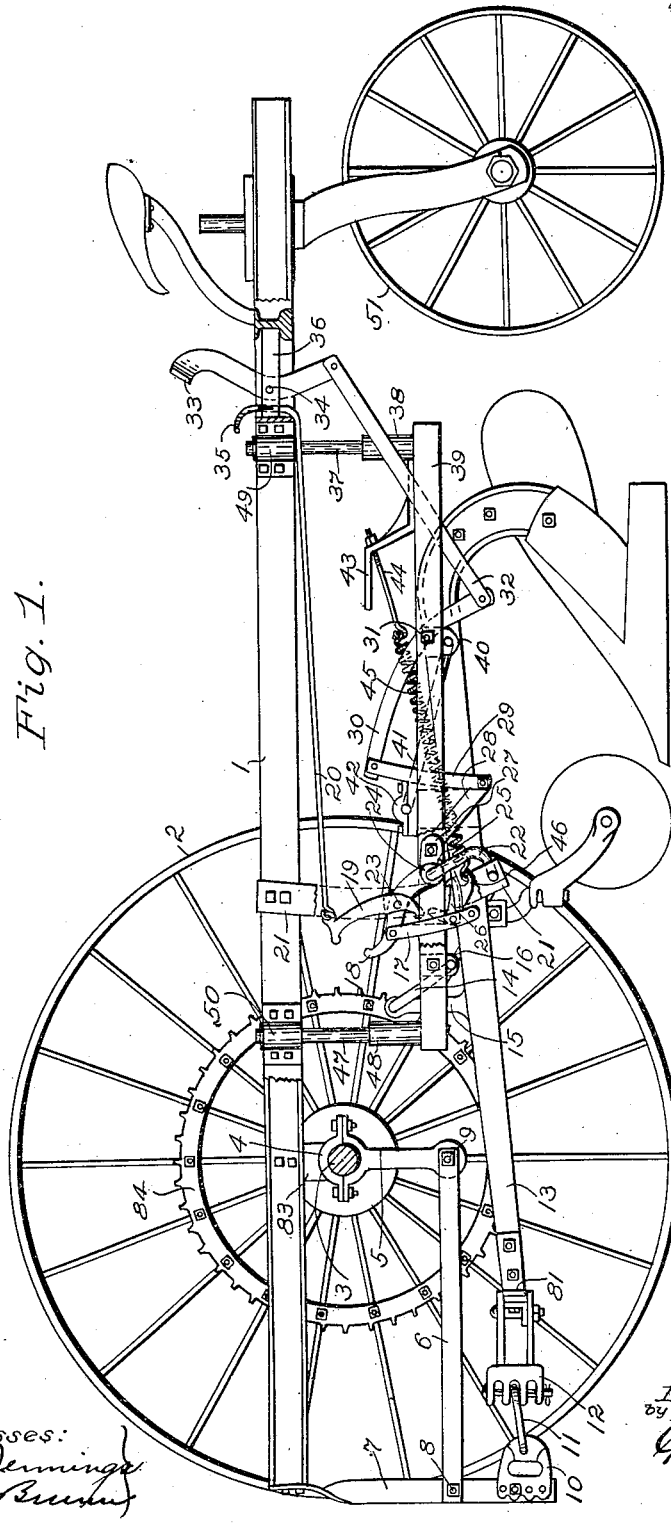
Figure 4:
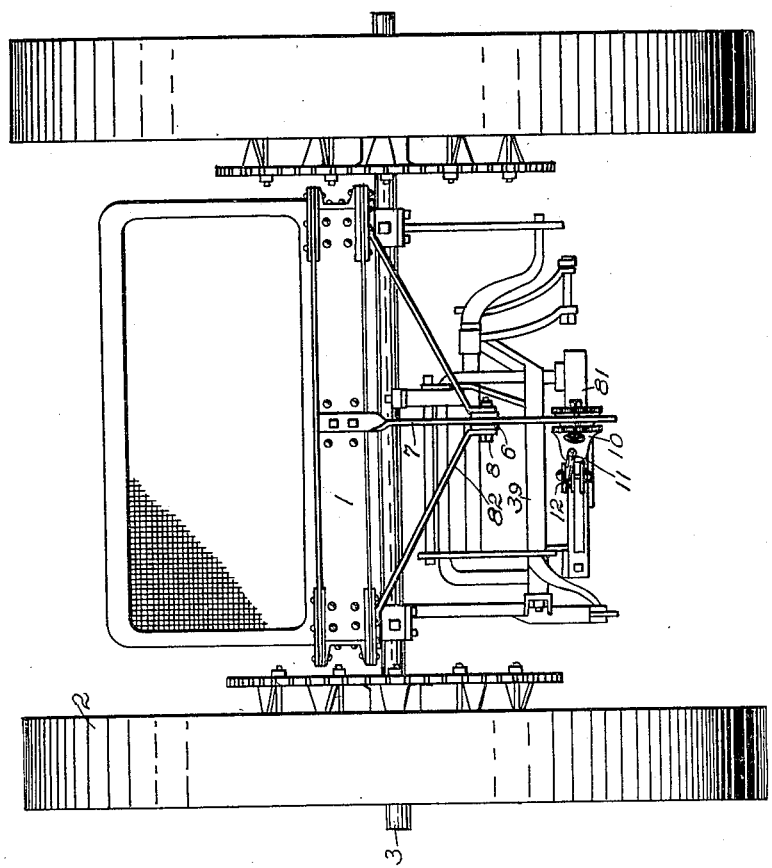

My invention relates to improvements in tractors, and the object of my invention is to provide for a tractor such means as will permit of rocking the implement connected thereto either transversely or longitudinally to conform it to irregularities in the ground traversed, with means for elevating or lowering the implement out of or into operative position, such means being arranged and located as to be easily accessible to the operator. This object I have accomplished by the means which are hereinafter described and claimed, and which are illustrated in the accompanying drawings, in which:

Figure 1 is a left-hand side elevation of a tractor frame supplied with my improved implement adjusting means, parts thereof being removed or broken away to better disclose the rest of the mechanism. Fig. 2 is a partial right-hand side elevation of the means specially adopted to rock the implement either transversely or longitudinally with relation to the main frame. Fig. 3 is a partial right-hand side elevation of such means as are included in the mechanism for tripping and releasing the implement to lower it into operative position. Fig. 4 is a front elevation of the tractor, showing the hitching means for securing the implement to the forward part of the main frame. Fig. 5 is a detail view, enlarged, of the rear swinging suspension-means for the sub-frame, and Fig. 6 is a similar view of the forward suspension-means for said sub-frame, with the supporting-sleeves for the hangers shown in vertical central section.

Similar numerals of reference denote corresponding parts throughout the several views.

Referring first to Fig. 1, in which the means adopted for raising or lowering the implement with relation to the main frame are disclosed: The numerals 1 indicate the horizontal rectangular main frame mounted in front on the traction-wheels 2, and in the rear on a single pivoted caster-wheel 51.
The traction-wheels 2 have sprocket-rims 84 secured thereon concentrically, and the latter may be driven by any prime motor mounted on said frame. The said traction-wheels are mounted to rotate on the ends of a fixed axle 3, the latter being seated fixedly in hangers 83 from the main frame 1. Underneath said main frame, depending therefrom and spaced apart therefrom, is a horizontal sub-frame 39. The forward end has each corner provided with a sleeve 48 which is slidably supported on a depending shaft 47 swingingly seated in a bearing 50 on said main frame. The said sub-frame has each rear corner provided with a sleeve 38 which is movably connected to the lower end of a depending shaft 37 whose upper end is swingingly seated in a bearing 49 also secured to said main frame. The said shafts or hangers 47 and 37 are of less diameters respectively than their sleeve-bearings 50 and 49, and have annular flanges at their tops resting upon the tops of said sleeve-bearings, which fits them to be supported therein to swing therefrom freely. Underneath said sub-frame 39 may be located any implement, such as the pair of plow-shares 62 and 63, whose beams 13 and 56 respectively are fixedly connected by means of an arched bar 57, while the forward ends of said beams are connected fixedly by a transverse bar 81. The two plows may therefore act together, and are movably connected to both said main and sub-frames by the following described connections and hitches.

Depending medially from the forward end of the main frame 1 is a hanger-bar 7. Depending also medially from the axle 3 is another hanger-bar 5, and a horizontal bar 6 is connected between the bars 7 and 5 by means of bolts 8 and 9. Clevises 10 and 12 are pivotally connected with the bar 7 and the transverse bar 81 at the forward ends of said plow-beams respectively, while said clevises are connected flexibly by means of a link 11, which thus permits movement to a certain extent of the plow-beams in any direction. Near the forward and rear ends of each side of the sub-frame 39 are fixed the short hangers 16 and 40, in which are respectively seated the lower ends of cranks 14 and 41, the uppermost ends of said cranks being connected across the sub-frame by cross-shafts which are seated to rock in the bearings 15 and 42 respectively fixedly mounted on the tops of said plow-beams.

The following means are used to raise or lower said plows into or out of operative position: 22 is a rock-shaft mounted transversely in bearings in said sub-frame, and upon it is mounted a sleeve 24 adapted to rock thereon, the latter provided with forwardly-projecting crank arms 18 and 58, also with a small rearwardly depending lug or catch 25, and also at its left-hand end with a short rearwardly-directed crank arm 27, which latter has a fixed arm 28 pivoted at its rear end to the lower end of a link 29. The upper end of said link 29 is pivoted to the forward upper end of a lever 30 medially fulcrumed on a bolt 31 extending through the left-hand side bar of said sub-frame 39. A link 32 serves to pivotally connect the lower end of the lever 30 to the lower end of another lever 33, the latter medially pivoted on a bolt or shaft 34 to longitudinal bars 36 mounted in the rear part of the main frame near the seat of the operator, the uppermost end of the lever 33 having its extremity bent laterally to serve as a foot-pedal. Like links 17 and 59 connect the crank arms 18 and 58 respectively to the middle parts of the plow beams 13 and 56. Upon the crank arm 18 is a stud 60 upon which is pivoted a hook 26 extending rearwardly, and a coiled tension spring 45 is connected between a lug 46 on the bottom of said hook and an eye-bar 44 whose rear threaded extremity is secured adjustably in a projection 43 on the rear end of said sub-frame. Pivotally connected to said crank-arm 18 between the sleeve 24 and the link 17 is an arm 19 whose lower end depends and is curved forwardly and located in the line of movement of an upwardly-extending lug on the hook 26. The upper end of said arm has a hook 61 to which is connected the forward hooked end of a rod 20, the rear end of said rod being bent upwardly and then laterally to form a foot-pedal 35. A cross-bar 54 with depending ends, is medially secured to the pedal-end of the rod 20, with its ends riding slidably upon parallel longitudinal bars 55 secured medially between the transverse bars 52 and 53 of the main frame 1 near the seat of the operator.

To raise the plows from their down position illustrated in Figs. 1 and 3, the pedal 33 is pushed forwardly, which by means of the above-described connections, causes the sleeve 24 and the crank-arms 18 and 58 to rock rearwardly, the links 17 and 59 then lifting the plow-beams 13 and 56 up equally, the cranks 14 and 41 also rocking up. As the link 17 moves up and rearwardly its hook 26 snaps up under the traction of said spring 45 and hooks into the catch 25 on the rear side of the sleeve 24 as said catch rocks downwardly with the sleeve. The hook is held in engagement with said catch which retains the plows in their uppermost or raised position. To lower said plows to their former position, it is merely necessary to push the other pedal 35 forwardly, the rod 20 pushing forward the arm 19, whose lower curved extremity hits the upstanding lug on the hook 26 and displaces the hook from the catch 25. Since there is no counteracting force acting upon the lever 33, the weight of the plows causes them to drop down to their lowered position.

I have provided the following means for adjusting and holding the plows in a desired operative position. To adjust and secure the plows in rocking them transversely to accommodate their positions to work over sloping ground, whose slope is transverse to the tractor, I employ the following means. Referring to Figs. 2 and 3, 72 is a rack-sector secured to the rear part of the right-hand side of the main frame 1, and 71 is a hand-lever pivoted thereto and provided with a movable detent adapted to detachably adjustably engage its teeth. The end of said lever below its fulcrum is pivoted to a link 70, and said link is also pivoted to the rear end of a lever 66 which is medially fulcrumed on a pintle 67 projected from a hanger 68 on said main frame. The forward end of said lever is connected by means of a link 65 with the end of a crank-arm 64 and the latter is fixed to the right-hand end of said transverse rock-shaft 22 mounted in bearings 69, in the sub-frame 39. Referring now to Fig. 1, it will be seen that a crank on the left-hand end of the shaft 22 has its end seated in a bearing opening in the lower end of a hanger-bar 21 fixedly depending from the main frame 1 above. It results from this arrangement of parts, that when it is desired to rock the plows to either side, it is but necessary to shift the hand-lever 71 to either side of the middle of the sector 72, and the intermediate connections will rock the shaft 22 and its crank appropriately to rock the plows transversely to the desired extent, but when the lever-detent is left engaged with the middle of the sector, the plows will remain level. To rock said plows longitudinally relatively to said main frame to place them properly for use when moving either up or down an inclined surface, the hand-lever 73 is employed. Said lever has a movable detent which may detachably adjustably engage the teeth of the rack-sector 74 secured to said main frame adjacent to the other sector, and easily within reach of the operator at the rear part of the tractor. A link 75 pivotally connects the lower member of said lever with the rear end of a lever 76, the latter being medially fulcrumed on a pintle 78 on a hanger 77 secured to the main frame. The forward end of said lever is pivoted on a stud 79 projected laterally from a short bracket 80 on the slide-body 48. When said lever is shifted to either side of the middle of the sector 74, it causes, through the coöperation of said connections the slide-body 48 to slide up or down a certain distance as desired on the hanger 47, which raises or lowers the forward part of the main frame to likewise act upon the plows or other implement suspended from said sub-frame. When the lever 73 is set medially on said sector, the plows are held longitudinally level relative to the main frame.

Having described my invention, what I claim as new, and desire to secure by Letters Patent, is:

1. In a tractor, in combination, an implement, a main frame, a sub-frame movably supported thereby, means for movably connecting the implement to said main frame, means for movably connecting said implement to said sub-frame, and means movably connected between said main frame, said sub-frame and said implement adapted to rock said implement transversely relatively to said main frame.

2. In a tractor, in combination, an implement, a main frame, a sub-frame depending therefrom movably, means for movably connecting the implement to both said main and said sub-frames, including a rock-shaft mounted in the said sub-frame, a lever fulcrumed in said main frame, a crank arm projecting from said shaft, a link between said crank arm and said implement, a catch on said shaft, a hook pivoted on said link and adapted to be engaged detachably with said catch, a spring connected between said hook and said sub-frame, operative connections between said lever and said shaft adapted to rock the latter to engage its catch with said hook while lifting said implement, an arm pivoted on said crank arm and having a projection adapted to throw said hook off said catch, and means for shifting said arm to disengage the said hook from said catch to permit the implement to descend under the action of gravity.

3. In a tractor, in combination, an implement, a main frame, a sub-frame movably depending therefrom, means for movably connecting the implement to both said main and sub-frames, including a rock-shaft mounted in the sub-frame, a foot-lever fulcrumed on said main-frame, a crank arm projecting from said shaft, a link between said crank arm and said implement, a catch on said shaft, a hook pivoted on said link and adapted to be engaged detachably with said catch, a spring connected between said hook and said sub-frame, a lever medially fulcrumed on said sub-frame, a link pivotally connected between the adjacent ends of said levers, a second crank arm projecting from said rock-shaft, a link pivotally connected between the other end of said lever on the sub-frame and said second crank arm, an arm pivoted on the first-mentioned crank on said rock-shaft and having its lower end formed and adapted to engage and throw said hook off said catch when shifted sufficiently, slide-bars in said main frame, and a rod having one end pivoted to the other end of the arm provided on the first-mentioned crank arm with its opposite end supported slidably upon said slide-bars.

4. In a tractor, in combination, an implement, a main frame, a sub-frame movably connected thereto, means for movably connecting the implement to both said main and said sub-frames, and means movably connected between said frames and said implement adapted to rock said implement transversely, comprising a hanger depending fixedly from said main frame, a rock-shaft mounted transversely in said sub-frame and having an end crank whose extremity is pivoted in said hanger, a crank secured to the said shaft, a rack-sector mounted on said main frame, a hand-lever fulcrumed on said main frame and adapted to be detachably and adjustably secured to said rack-sector, and operative connections between said hand-lever, said main frame and the said second-mentioned crank on said rock-shaft.

5. In a tractor, in combination, an implement, a main frame, a sub-frame movably connected thereto, means for movably connecting the implement to both said main and said sub-frames, means movably connected between said frames and said implement adapted to rock said implement transversely, comprising a hanger depending fixedly from said main frame, a rock-shaft mounted transversely in said sub-frame and having an end crank whose extremity is pivoted in said hanger, a crank secured to the said shaft, a rack-sector mounted on said main frame, a hand-lever fulcrumed in said main frame and adapted to be detachably and adjustably secured to said rack-sector, operative connections between said hand-lever, said main frame and the said second-mentioned crank on said rock-shaft, and means for rocking said implement vertically and longitudinally relative to said main frame, comprising a rack-sector on said main frame, a hand-lever fulcrumed on said main frame and having means adapted to detachably and adjustably engage it with said rack-sector, and operative connections pivotally connected between said hand-lever, said main frame and said sub-frame, adapted when said hand-lever is adjusted upon said rack-sector to rock said sub-frame and implement vertically longitudinally to a desired extent.

6. In a tractor, in combination, an implement, a main frame, a sub-frame movably connected thereto, means for movably connecting the implement to both said main and said sub-frames, means movably connected between said frames and said implement adapted to rock said implement transversely, comprising a hanger depending fixedly from said main frame, a rock-shaft mounted transversely in said sub-frame and having an end crank whose extremity is pivoted in said hanger, a crank secured to the said shaft, a rack-sector mounted on said main frame, a hand-lever fulcrumed in said main frame and adapted to be detachably and adjustably secured to said rack-sector, operative connections between said hand-lever, said main frame and the said second-mentioned crank on said rock-shaft, means for rocking said implement vertically and longitudinally relative to said main frame, comprising a rack-sector on said main frame, a hand-lever fulcrumed on said main frame and having means adapted to detachably and adjustably engage it with said rack-sector, operative connections pivotally connected between said hand-lever, said main frame and said sub-frame, adapted when said hand-lever is adjusted upon said rack-sector to rock said sub-frame and implement vertically longitudinally to a desired extent, and means for raising or lowering said implement relatively to said main frame, including a sleeve mounted to rock upon said rock-shaft, a lever fulcrumed in said main frame and provided with a pedal, a crank projecting from said sleeve, a link between said crank and said implement, a catch on said sleeve, a hook pivoted to said link and adapted to be engaged detachably with said catch, a spring connected between said hook and said sub-frame, operative connections between said pedal-bearing lever and said sleeve adapted to rock the latter to engage its catch with said hook while the crank on the sleeve is lifting said implement, an arm pivoted to said crank and having a projection adapted to engage and throw said hook off the catch when moved to a certain position, and means for shifting said arm to disengage said hook from said catch.

Signed at Waterloo, Iowa, this 24th day of May, 1912.

DAVID CONN, Jr.

Witnesses:
W. H. Brunn,
G. C. Kennedy.